United States Patent [19]
Kawamoto et al.

[11] Patent Number: 5,717,622
[45] Date of Patent: Feb. 10, 1998

[54] SELECTING CIRCUIT INCLUDING CIRCUITS HAVING DIFFERENT TIME CONSTANTS TO WHICH EACH OF A PLURALITY OF INPUT SIGNALS IS APPLIED, AND ADDING CIRCUIT USING THE SAME

[75] Inventors: Kiyofumi Kawamoto; Shinichi Nakagawa, both of Hyogo, Japan

[73] Assignees: Mitsubishi Denki Kabushiki Kaisha; Mitsubishi Electric Engineering Co., Ltd., both of Tokyo, Japan

[21] Appl. No.: 463,256

[22] Filed: Jun. 5, 1995

[30] Foreign Application Priority Data

Sep. 1, 1994 [JP] Japan ................................. 6-208732

[51] Int. Cl.$^6$ ................................................. G05F 7/50
[52] U.S. Cl. ............................................................ 364/784
[58] Field of Search .................................... 364/784, 786

[56] References Cited

U.S. PATENT DOCUMENTS 4,683,548  7/1987  Mlynek ................................. 364/786
5,231,318  7/1993  Reddy .................................. 307/530

OTHER PUBLICATIONS

"Principles of CMOS VLSI Design a Systems Perspective", By Addison-Wesley Publishing Company, Neil Weste et al.

*Primary Examiner*—Tan V. Mai
*Attorney, Agent, or Firm*—Lowe, Price, LeBlanc & Becker

[57] ABSTRACT

A selecting circuit is formed of two tristate gates. The size of each of a plurality of transistors configuring a tristate gate processing a signal having a shorter delay time is set smaller than the size of each of a plurality of transistors configuring a tristate gate processing a signal having a longer delay time, so that the capacitance of the former transistors is decreased. As a result, the load to be driven by each of transistors to which a signal having a longer delay time is applied is decreased, whereby the entire circuit can be increased in operation speed. Accordingly, the selecting circuit selecting between two or more input signals having different delay times can operate at a high speed.

15 Claims, 14 Drawing Sheets

F I G. 1 4   PRIOR ART

| A | B | CI | N1 | COC | S |
|---|---|---|---|---|---|
| 0 | 0 | 0 | 0 | 1 | 0 |
| 0 | 1 | 0 | 1 | 1 | 1 |
| 1 | 0 | 0 | 1 | 1 | 1 |
| 1 | 1 | 0 | 0 | 0 | 0 |
| 0 | 0 | 1 | 0 | 1 | 1 |
| 0 | 1 | 1 | 1 | 0 | 0 |
| 1 | 0 | 1 | 1 | 0 | 0 |
| 1 | 1 | 1 | 0 | 0 | 1 |

$N1 = A \oplus B$ $N1 = 1 : S = /CI, COC = /CI$ $N1 = 0 : S = CI, COC = /A = /B$

SELECTING CIRCUIT INCLUDING CIRCUITS HAVING DIFFERENT TIME CONSTANTS TO WHICH EACH OF A PLURALITY OF INPUT SIGNALS IS APPLIED, AND ADDING CIRCUIT USING THE SAME

BACKGROUND OF THE INVENTION

1. Field of the Invention

The present invention relates to a selecting circuit and an adding circuit using the same, and more particularly, to a selecting circuit selecting between two or more input signals having different transmission delay times and outputting the selected signal, and an adding circuit using the same.

2. Description of the Background Art

FIG. 12 is a diagram showing a circuit configuration of a conventional selecting circuit selecting between two signals and outputting one of them.

Referring to FIG. 12, an input terminal B is connected to the input of a transmission gate 20a formed of an N type MOS transistor 12a and a P type MOS transistor 10a through an inverter 1a. An input terminal A is connected to the input of a transmission gate 20b formed of an N type MOS transistor 12b and a P type MOS transistor 10b through an inverter 1b. The outputs of transmission gates 20a and 20b are connected to an output terminal COC. A select signal input terminal SA is connected to the gate electrode of P type MOS transistor 10a, the gate electrode of N type MOS transistor 12b, and the input of an inverter 1c. The output of inverter 1c is connected to the gate electrode of N type MOS transistor 12a and the gate electrode of P type MOS transistor 10b.

When a select signal input from select signal input terminal SA is "1", transmission gate 20a is turned off, transmission gate 20b is turned on, and an inversion of a signal input from input terminal A is provided to output terminal COC. When the select signal input from select signal input terminal SA is "0", transmission gate 20a is turned on, transmission gate 20b is turned off, and an inversion of a signal input from input terminal B is provided to output terminal COC.

FIG. 13 is a circuit configuration diagram showing one example of a full adder using the selecting circuit of FIG. 12. FIG. 14 is a diagram showing a truth table of the full adder of FIG. 13.

The full adder of FIG. 13 includes an exclusive OR gate 40, inverters 1f and 1g, and transmission gates 20c–20f.

In exclusive OR gate 40, input terminal A is connected to the input of inverter 1a, and the output of inverter 1a is connected to the input of transmission gate 20a, and the input of transmission gate 20b through inverter 1b. Transmission gate 20a is configured of P type MOS transistor 10a and N type MOS transistor 12a, and transmission gate 20b is configured of P type MOS transistor 10b and N type MOS transistor 12b. The outputs of transmission gates 20a and 20b are both connected to a node N2 and a node N1 through an inverter 1e. Input terminal B is connected to the input of inverter 1c. The output of inverter 1c is connected to a node N3 and respective gate electrodes of N type MOS transistor 12a and P type MOS transistor 10b. The output of inverter 1c is further connected to respective gate electrodes of P type MOS transistor 10a and N type MOS transistor 12b through an inverter 1d.

Node N1 is connected to the input of transmission gate 20c, respective gate electrodes of a P type MOS transistor 10e and an N type MOS transistor 12f, and the input of transmission gate 20d through inverter 1f. The outputs of transmission gates 20c and 20d are both connected to a sum signal output terminal S.

Node N2 in exclusive OR gate 40 is connected to respective gate electrodes of an N type MOS transistor 12e and a P type MOS transistor 10f. A carry input terminal CI is connected to respective gate electrodes of a P type MOS transistor 10c and N type MOS transistor 12d, and through inverter 1g to the input of transmission gate 20f and respective gate electrodes of an N type MOS transistor 12c and P type MOS transistor 10d.

Node N3 in exclusive OR gate 40 is connected to the input of transmission gate 20e. The outputs of transmission gates 20e and 20f are connected to carry output terminal COC.

Operation of the full adder of FIG. 13 will now be described. A one-bit signal of binary data is applied to data input terminal A, and another one-bit signal of binary data is applied to data input terminal B. A carry signal provided from the full adder on the less significant bit side is applied to carry input terminal CI. As a result, the addition result is provided to sum signal output terminal S, and an inversion of a carry signal is provided to carry output terminal COC.

A signal at node N1 represents an exclusive logical sum of data of data input terminal A and data of data input terminal B. More specifically, when data of data input terminal A is different from data of data input terminal B, the signal at node N1 attains "1", and when data of data input terminal A is the same as data of data input terminal B, the signal at node N1 attains "0".

When the signal at node N1 is "1", transmission gate 20f is turned on, and transmission gate 20e is turned off. Therefore, an inversion of the carry signal of carry input terminal CI is propagated to carry output terminal COC.

When the signal at node N1 is "0", transmission gate 20e is turned on, and transmission gate 20f is turned off. Therefore, an inversion of an input signal B is propagated to carry output terminal COC.

As shown in FIG. 14, when data of input terminals A and B are both "0", the signal at node N1 attains "0". As a result, "1" which is an inversion of input signal B is propagated to carry output terminal COC. This state is called a "Kill" state.

When data of input terminals A and B are both "1", the signal at node N1 attains "0". As a result, "0" which is an inversion of input signal B is propagated to carry output terminal COC. This state is called a "Generate" state.

When data input terminal A is different from data of input terminal B, the signal at node N1 attains "1". As a result, an inversion of the carry signal at carry input terminal CI is propagated to carry output terminal COC. Therefore, when the carry signal at carry input terminal CI is "0", the carry signal at carry output terminal COC attains "1". When the carry signal at carry input terminal CI is "1", the carry signal at carry output terminal COC attains "0". This state is called a "Propagate" state.

If the carry signal from carry input terminal CI is "1", transmission gate 20c is turned off, transmission gate 20d is turned on, and an inversion of the signal at node N1 is provided to sum signal output terminal S. If the carry signal from carry input terminal CI is "0", transmission gate 20c is turned on, transmission gate 20d is turned off, and the signal at node N1 is provided to sum signal output terminal S.

As a result, in the full adder of FIG. 13, based on data of input terminal A, data of input terminal B, and the carry signal of carry input terminal CI, the sum of data of input terminal A and data of input terminal B is obtained at sum signal output terminal S as a sum signal, and the carry signal is obtained at carry output terminal COC.

In the full adder of FIG. 13, a carry input signal applied to carry input terminal CI is propagated by the full adder at the previous stage, and has a longer delay time than data signals to be applied to data input terminals A and B. The signal delay is a primary factor which prevents increase in speed of the entire adder.

SUMMARY OF THE INVENTION

One object of the present invention is to increase signal processing speed in a selecting circuit.

Another object of the present invention is to make small the difference in delay time between input signals in the selecting circuit.

Still another object of the present invention is to increase signal processing speed in an adding circuit.

In order to achieve the above objects, the selecting circuit according to the present invention selecting among a plurality of input terminals in response to an applied first or second select signal and providing the same to an output node includes: a first output circuit having a first time constant for selectively providing a first input signal among the plurality of input signals to the output node in response to the first select signal; and a second output circuit having a second time constant larger than the first time constant for selectively providing a second input signal out of the plurality of input signals to the output node in response to the second select signal.

The selecting circuit structured as described above can perform processing according to the delay time of the input signal by making different the time constant of the first output circuit and the time constant of the second output circuit different.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing a truth table of the adder of FIG. 13.

DESCRIPTION OF THE PREFERRED EMBODIMENTS

Figure 1:
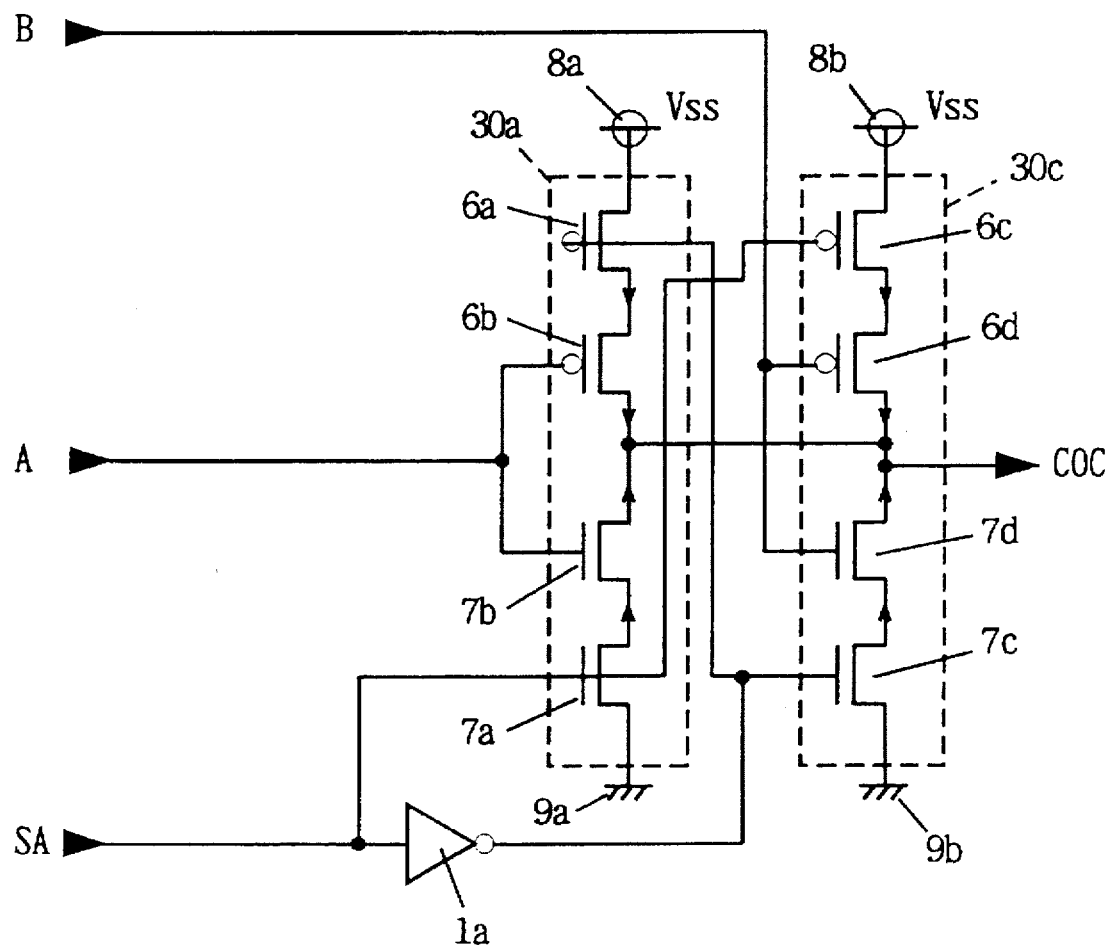
FIG. 1 is a circuit diagram of a selecting circuit according to a first embodiment of the present invention.

FIG. 1 is a circuit diagram of the selecting circuit according to the first embodiment of the present invention.

Referring to FIG. 1, P type MOS transistors 6a and 6b, and N type MOS transistors 7b and 7a are connected in series between a power supply node 8a and a ground node 9a, and configure a tristate gate (tristate buffer) 30a. Respective gate electrodes of P type MOS transistor 6b and N type MOS transistor 7b are connected to input terminal A. Respective drain electrodes of P type MOS transistor 6b and N type MOS transistor 7b are connected to output terminal COC.

P type MOS transistors 6c and 6d, and N type MOS transistors 7c and 7d are connected in series between a power supply node 8b and a ground node 9b, and configure a tristate gate 30c. Respective gate electrodes of P type MOS transistor 6d and N type MOS transistor 7d are connected to input terminal B. Respective drain electrodes of P type MOS transistor 6d and N type MOS transistor 7d are connected to output terminal COC. Select signal input terminal SA is connected to respective gate electrodes of N type MOS transistor 7a and P type MOS transistor 6c, and to respective gate electrodes of P type MOS transistor 6a and N type MOS transistor 7c through inverter 1a.

In the selecting circuit of this embodiment, the size of transistors in the tristate gate processing a signal having a shorter delay time is set smaller than the size of transistors in the tristate gate processing a signal having a longer delay time.

If a signal input to input terminal A has a longer delay time than a signal input to input terminal B, for example, the size of transistors 6c, 6d, 7c, and 7d configuring tristate gate 30c to which a signal having a shorter delay time is applied is set smaller (for example ⅓) than of the size of transistors 6a, 6b, 7a, and 7b configuring tristate gate 30a to which an input signal having a longer delay time is applied.

In order to further increase the output speed of input A, it is preferable to set the size of transistors 6d and 7d on the drain side of tristate gate 30c smaller than the size of transistors 6c and 7c on the source side, or to set the size of transistors 6d, 7d, 6b, and 7b on respective drain sides of tristate gates 30a and 30c smaller (for example, ½) than the size of transistors 6c, 7c, 6a, and 7a on respective source sides of tristate gates 30a and 30c.

Description will now be given of the effect of the size of transistors, and the effect brought about by changing the size.

Figure 2:
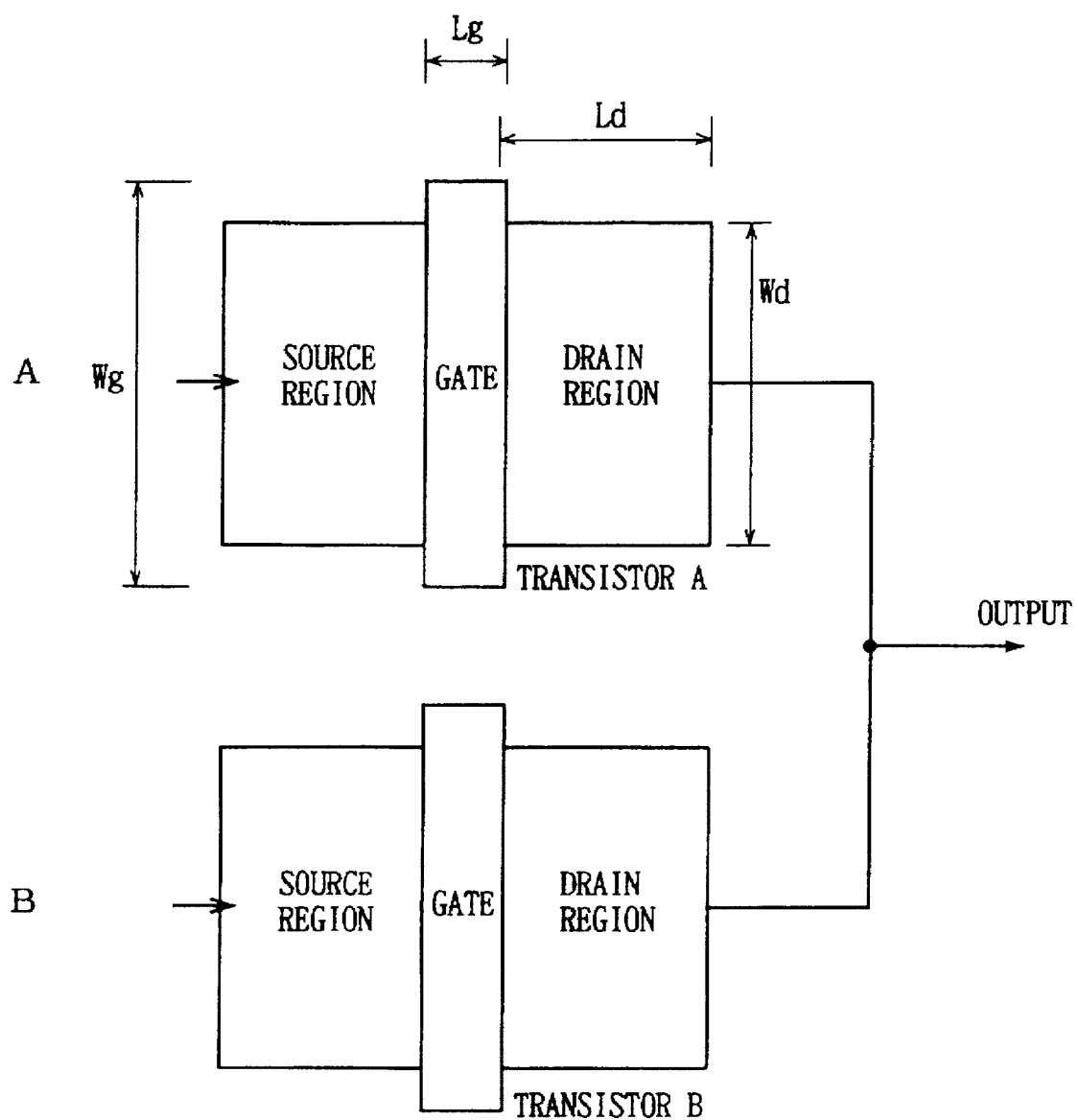
FIG. 2 is a diagram for explaining the size of transistors in the selecting circuit of FIG. 1.

FIG. 2 is a diagram for explaining the size of transistors of the selecting circuit of FIG. 1.

In this embodiment, the size of a transistor means the gate width Wg and an area of the drain region. More specifically, a transistor large in size means that the transistor has a long gate width Wg and/or a large drain region. A transistor small in size means that the transistor has a short gate width and/or a small drain region.

Referring to FIG. 2, when a signal input to a transistor B has a longer delay time than a signal input to a transistor A, the size of transistor A is set smaller (more specifically, one or some of Wg (gate width), Ld, and Wd is set smaller). This causes the load drivability of transistor A to decrease. Therefore, a signal output from transistor A has a longer delay time than the case where the size of transistor A is large. Since transistors A and B are connected in series at their output portions, the reduced size of transistor A causes the capacitance of transistor A to decrease. The load capacitance to be driven by transistor B decreases, and the output of transistor B becomes faster than the case where the size of transistor A is large.

As a result, the signal which was faster becomes slower, and the signal which was slower becomes faster, so that the difference between signal transmission times can be made smaller.

Operation of the selecting circuit of FIG. 1 will now be described.

When select signal SA is "1" in the circuit of FIG. 1, N type MOS transistor 7a and P type MOS transistor 6a are turned on, and P type MOS transistor 6c and N type MOS transistor 7c are turned off. As a result, an inversion of a signal applied from input terminal A is propagated to output terminal COC. Since the size of transistors 6c, 6d, 7c, and 7d configuring tristate gate 30c is set smaller than the size of transistors 6a, 6b, 7a, and 7b configuring tristate gate 30a at the time, the load of transistors 6a and 7b becomes smaller than the case where all the transistors have the same size. As a result, an inversion of a signal applied from input terminal A is provided to output terminal COC faster.

When a signal from select signal input terminal SA is "0", P type MOS transistor 6a and N type MOS transistor 7a are turned off, and P type MOS transistor 6c and N type MOS transistor 7c are turned on. As a result, an inversion of a signal input from input terminal B is provided to output terminal COC.

Figure 3:
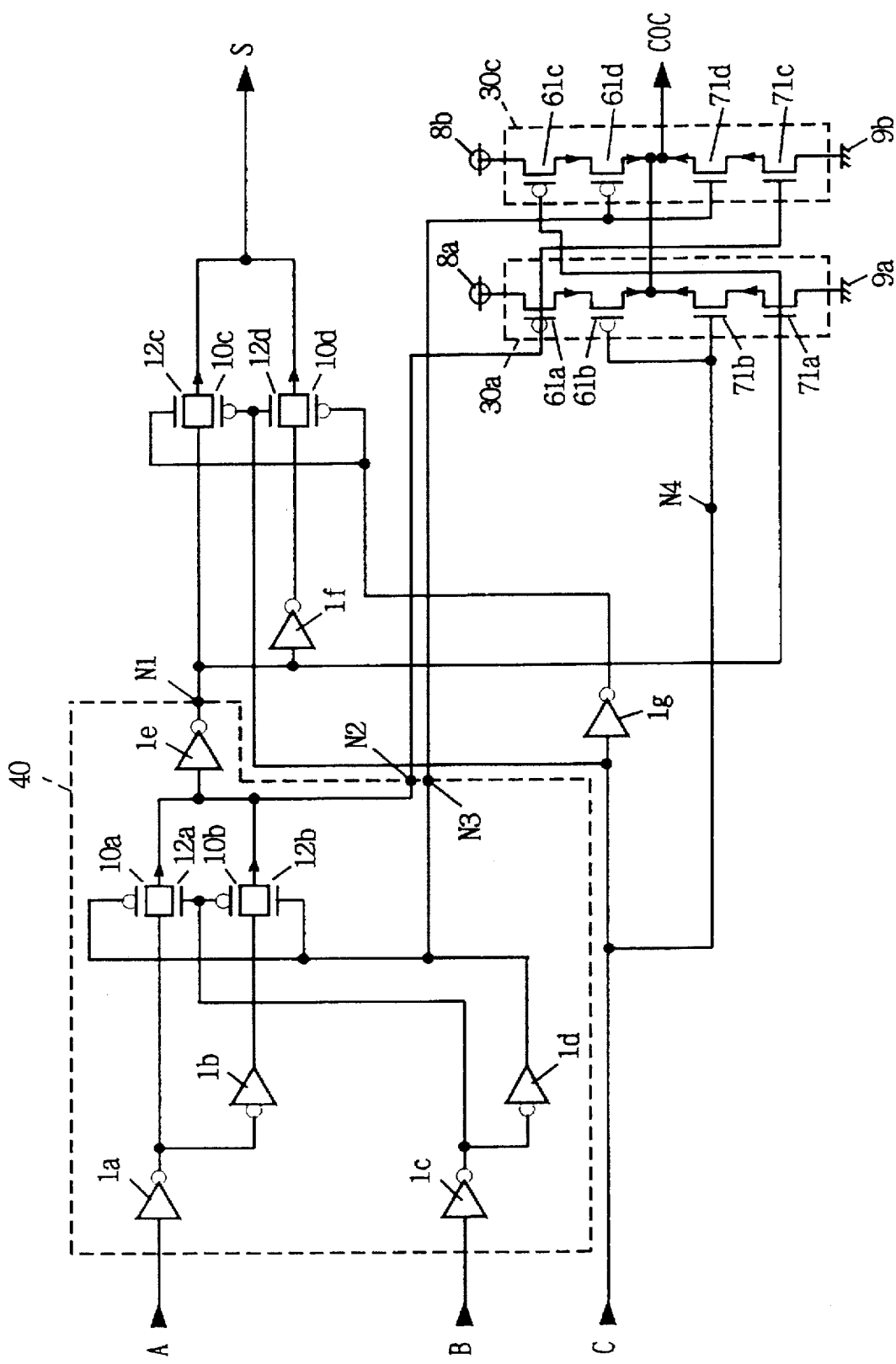
FIG. 3 is a diagram of an adding circuit in which the selecting circuit of FIG. 1 is used in a carry output portion (carry signal output portion), according to a second embodiment of the present invention.

FIG. 3 is a diagram showing an adding circuit in which the selecting circuit of FIG. 1 is used in a carry output portion (carry signal output portion), according to the second embodiment of the present invention.

Figure 13:
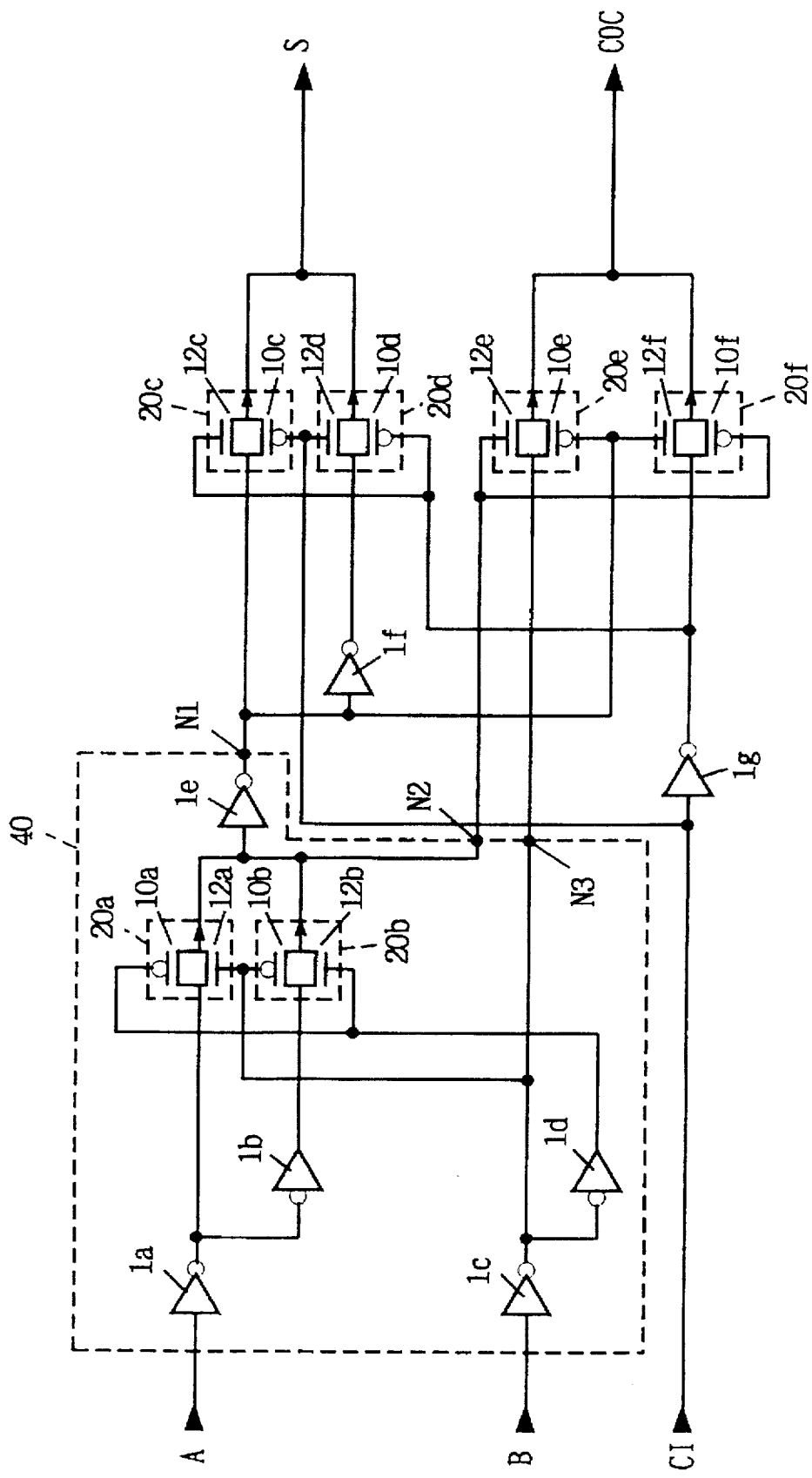
FIG. 13 is a circuit diagram showing one example of a full adder in which the selecting circuit of FIG. 12 is used.

This adding circuit is different from the conventional adding circuit of FIG. 13 in that the selecting circuit using tristate gates of FIG. 1 is used instead of the selecting circuit using transmission gates of the carry output portion of FIG. 13.

More specifically, select signal input terminal SA of the selecting circuit of FIG. 1 corresponds to node N1 of FIG. 3, input terminal A of FIG. 1 corresponds to a node N4 of FIG. 3, and input terminal B of FIG. 1 corresponds to node N3 of FIG. 3.

As a result, as in the case of the circuit of FIG. 13, when the output at node N1 is "1", an inversion of the carry signal of carry input terminal CI is propagated to carry output terminal COC.

On the other hand, when the output at node N1 is "0", an inversion of input signal B is propagated to carry output terminal COC.

In the adding circuit of FIG. 3, a signal from carry signal input terminal CI has a longer delay time than a signal from input terminal B. Therefore, the size of transistors 61c, 61d, 71c, and 71d is set smaller than the size of transistors 61a, 61b, 71a, and 71b.

In order to increase operation speed, it is preferable to set the transistor size of P type MOS transistor 61d and N type MOS transistor 71d smaller than the transistor size of P type MOS transistor 61c and N type MOS transistor 71c, or to set the size of transistors 61d, 71d, 61b, and 71b smaller than the size of transistors 61c, 71c, 61a, and 71a.

In the selecting circuit using tristate gates, the signal processing speed is higher than that in the selecting circuit using transmission gates. Therefore, even if the size of transistors is not changed, the processing speed of the adding circuit shown in FIG. 3 is higher than that of an adder shown in FIG. 11. However, by making transistors different in size as described above, the processing speed of the adding circuit of FIG. 3 is further increased.

Figure 4:
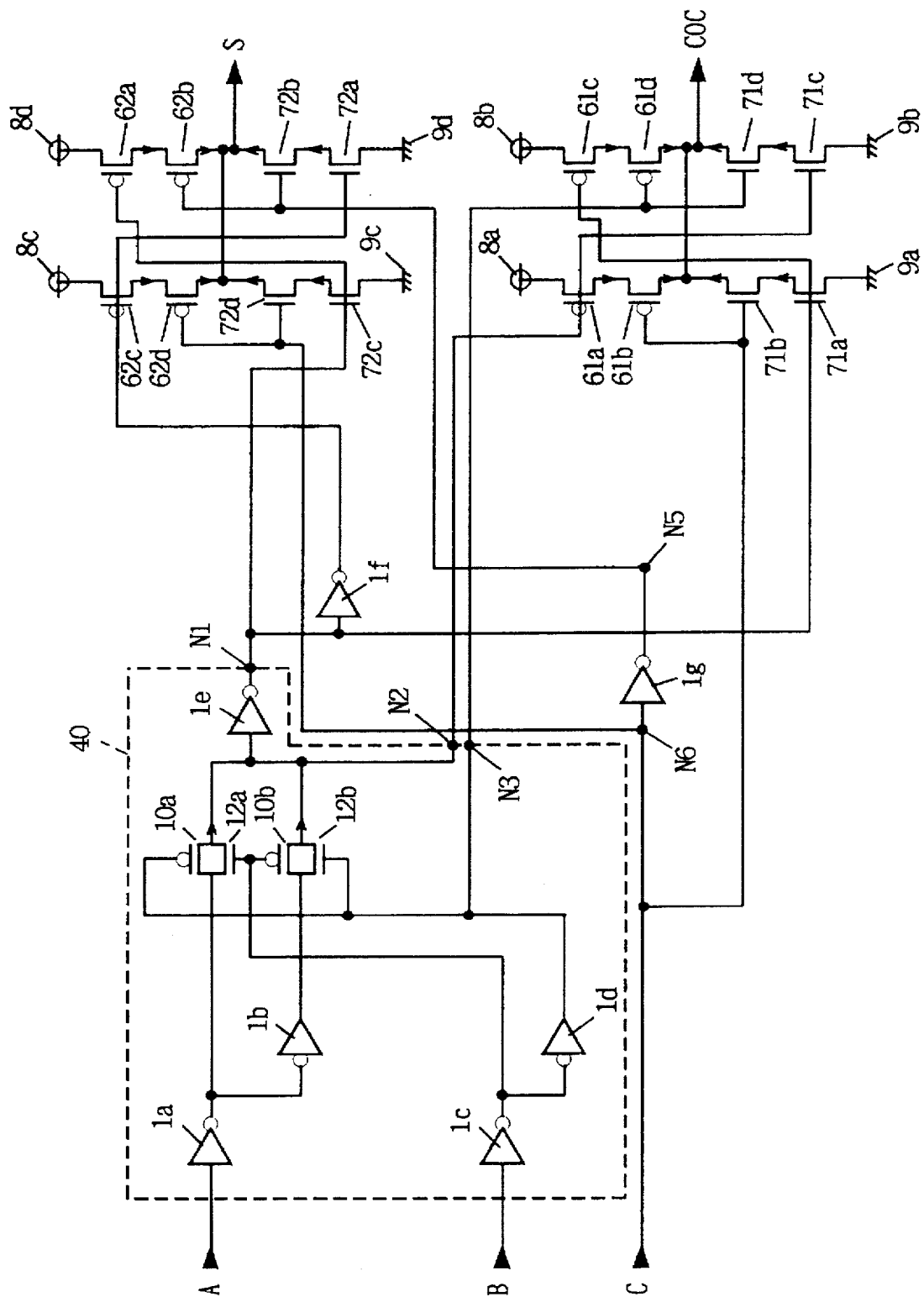
FIG. 4 is a diagram of an adding circuit in which the selecting circuit of FIG. 1 is used in a sum signal output portion of the adding circuit of FIG. 3, according to a third embodiment of the present invention.

FIG. 4 shows an adding circuit obtained by using the selecting circuit of FIG. 1 in a sum signal output portion of the adding circuit of FIG. 3, according to the third embodiment of the present invention.

Input terminal B of the circuit diagram of FIG. 1 corresponds to a node N5 of FIG. 4, input terminal A of the circuit diagram of FIG. 1 corresponds to a node N6 of FIG. 4, and select signal input terminal SA of the circuit diagram of FIG. 1 corresponds to node N1 of FIG. 4.

A signal at node N5 has a longer delay time than a signal at node N6, because the former signal passes through inverter 1g. Therefore, the size of transistors 62c, 62d, 72c, and 72d is set smaller than the size of transistors 62a, 62b, 72a, and 72b.

In order to increase processing speed, it is preferable to set the size of transistors 62d and 72d smaller than the size of transistors 62c and 72c, or to set the size of transistors 62d, 72d, 62b, and 72b smaller than the size of transistors 62c, 72c, 62a, and 72a.

Even if the size of transistors is not changed in the adding circuit of FIG. 4, the processing speed of the adding circuit of FIG. 4 is higher than that of the adding circuit shown in FIG. 3, as far as the output speed of a sum signal is concerned.

Figure 5:
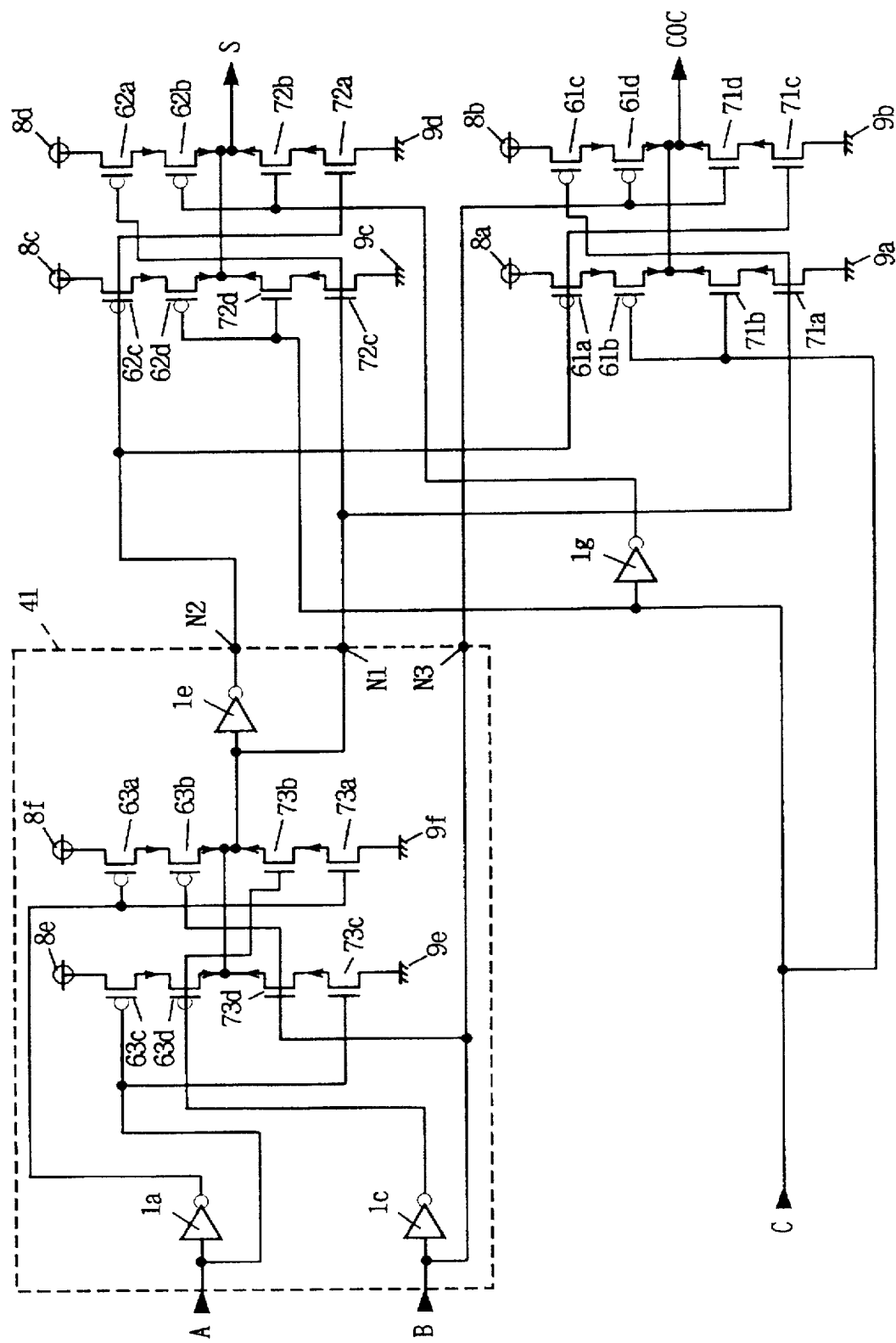
FIG. 5 is a circuit diagram of an adding circuit in which exclusive OR gate 40 of FIG. 4 is configured of tristate gates, according to a fourth embodiment of the present invention.

FIG. 5 is a circuit diagram of an adding circuit obtained by configuring exclusive OR gate 40 of FIG. 4 of tristate gates, according to the fourth embodiment of the present invention.

In this circuit diagram, an exclusive OR gate 41 is configured as follows.

P type MOS transistors 63c and 63d, and N type MOS transistors 73c and 73d are connected in series between a power supply node 8e and a ground node 9e. P type MOS transistors 63a and 63b, and N type MOS transistors 73a and 73b are connected in series between a power supply node 8f and a ground node 9f. The drain electrodes of P type MOS transistors 63b and 63d and N type MOS transistors 73b and 73d are connected to node N1, and to node N2 through inverter 1e. Data input terminal A is connected to the input of inverter 1a, and respective gate electrodes of P type MOS transistor 63c and N type MOS transistor 73c. The output of inverter 1a is connected to respective gate electrodes of P type MOS transistor 63a and N type MOS transistor 73a. Data input terminal B is connected to the input of inverter 1c, node N3, and respective gate electrodes of N type MOS transistor 73d and P type MOS transistor 63b, and the output of inverter 1c is connected to respective gate electrodes of P type MOS transistor 63d and N type MOS transistor 73b.

In the circuit diagram, the signal at node N1 represents an exclusive logical sum of data of input terminal A and data of input terminal B, similarly to the case of operation in the circuit diagram of FIG. 4.

By using tristate gates for an exclusive OR gate, the following advantage is obtained. More specifically, a tristate gate has a power supply node 8 and a ground node 9, and also serves as a driver. Therefore, the number of inverters connected to serve as drivers in exclusive OR gate 40 of FIG. 4 can be reduced, whereby the signal processing speed can be increased.

Figure 6:
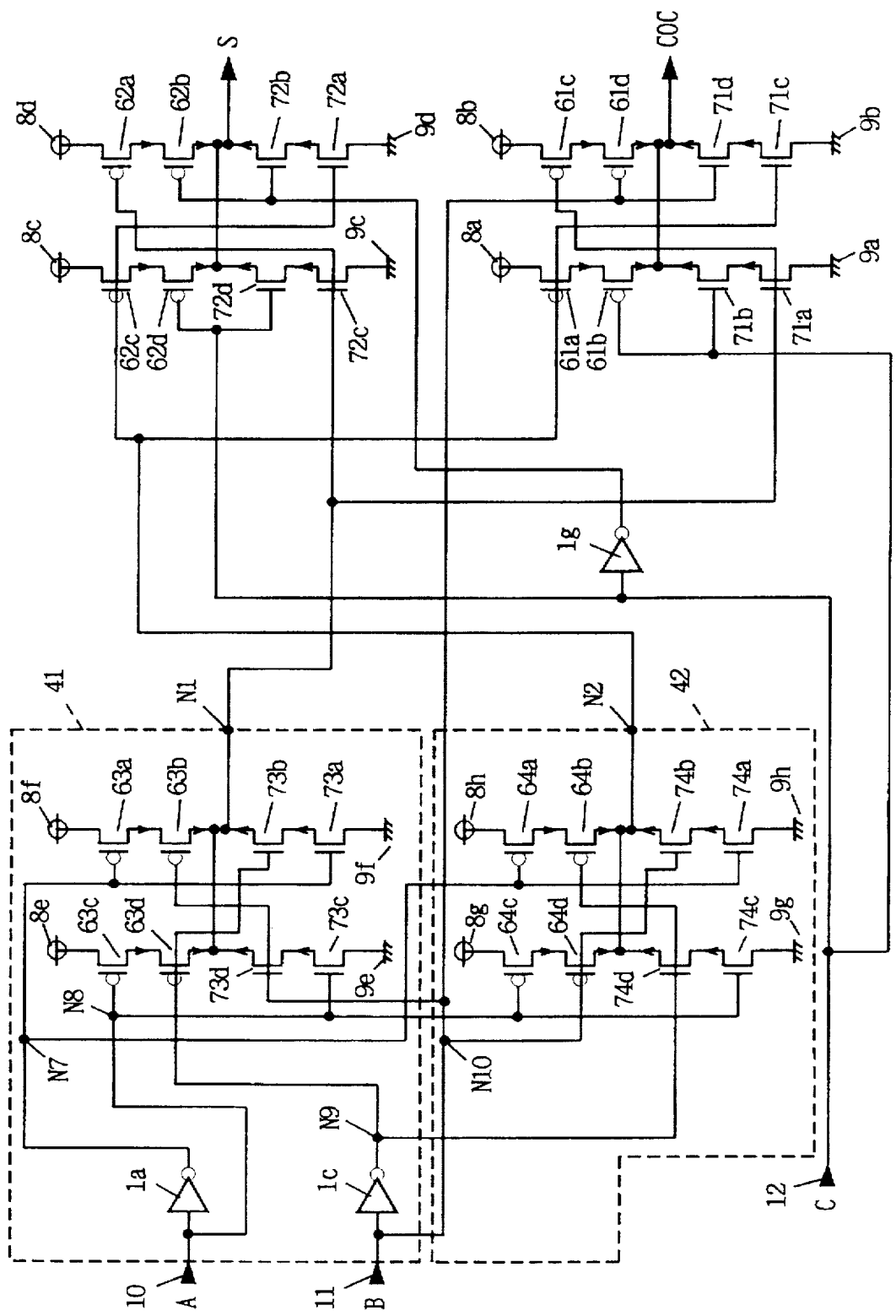
FIG. 6 is a circuit diagram of an adding circuit in which an exclusive NOR gate 42 is added to the adder of FIG. 5, according to a fifth embodiment of the present invention.

FIG. 6 is a circuit diagram of an adding circuit obtained by adding an exclusive NOR gate 42 to the adding circuit of FIG. 5, according to the fifth embodiment of the present invention.

Exclusive NOR gate 42 is configured as follows.

P type MOS transistors 64c and 64d, and N type MOS transistors 74c and 74d are connected in series between a power supply node 8g and a ground node 9g. P type MOS transistors 64a and 64b, and N type MOS transistors 74a and 74b are connected in series between a power supply node 8h and a ground node 9h. The drain electrodes of P type MOS transistors 64d and 64b, and N type MOS transistor 74b and 74d are connected to the gate electrodes of P type MOS transistor 62c, N type MOS transistor 72a, P type MOS transistor 61a, and N type MOS transistor 71c through node N2.

The output of inverter 1a in exclusive OR gate 41 is further connected to the gate electrodes of P type MOS transistor 64a and N type MOS transistor 74a through a node N7, in addition to connection in the fourth embodiment.

In addition to connection in the fourth embodiment, data input terminal A is further connected to the gate electrodes of P type MOS transistors 64c and 74c through a node N8. The output of inverter 1c is further connected to the gate electrodes of N type MOS transistor 74d and P type MOS transistor 64b through a node N9, in addition to connection in the fourth embodiment. Data input terminal B is further connected to the gate electrodes of P type MOS transistor 64d and N type MOS transistor 74b through a node N10, in addition to connection in the fourth embodiment.

In the adding circuit of FIG. 5, the exclusive OR output of signals A and B (node N1) is further inverted by inverter 1e and provided at node N2. However, in the adding circuit of FIG. 6, the exclusive NOR output of signals A and B is directly provided at node N2. Therefore, in the adding circuit of FIG. 6, inverter 1e can be omitted, and the processing speed can be more increased than in the adding circuit of FIG. 5.

Figure 7:
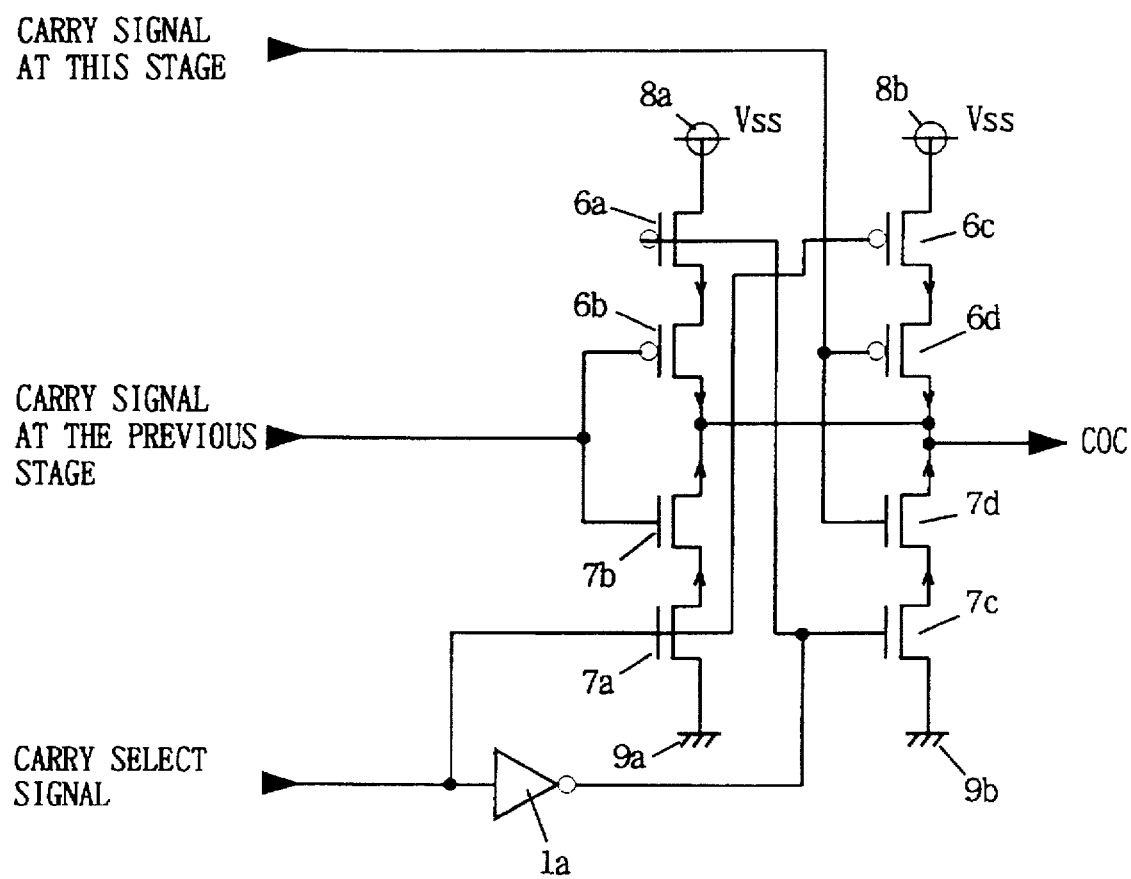
FIG. 7 is a circuit diagram of a carry selecting circuit of a carry look ahead circuit using the selecting circuit of FIG. 1, according to a sixth embodiment of the present invention.
Figure 8:
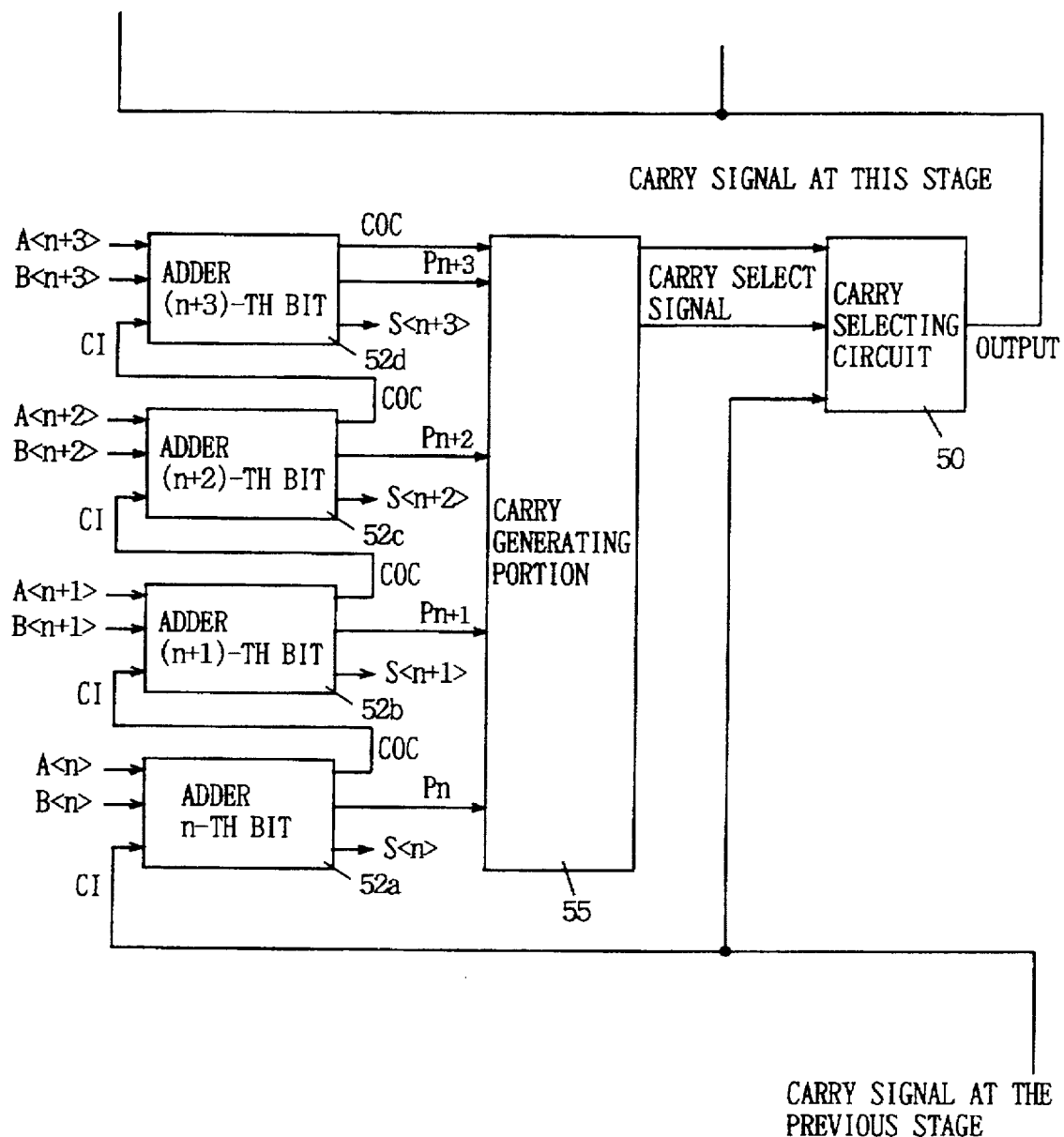
FIG. 8 is a block diagram of an adder with a carry look ahead circuit using the carry selecting circuit of FIG. 7.
Figure 9:
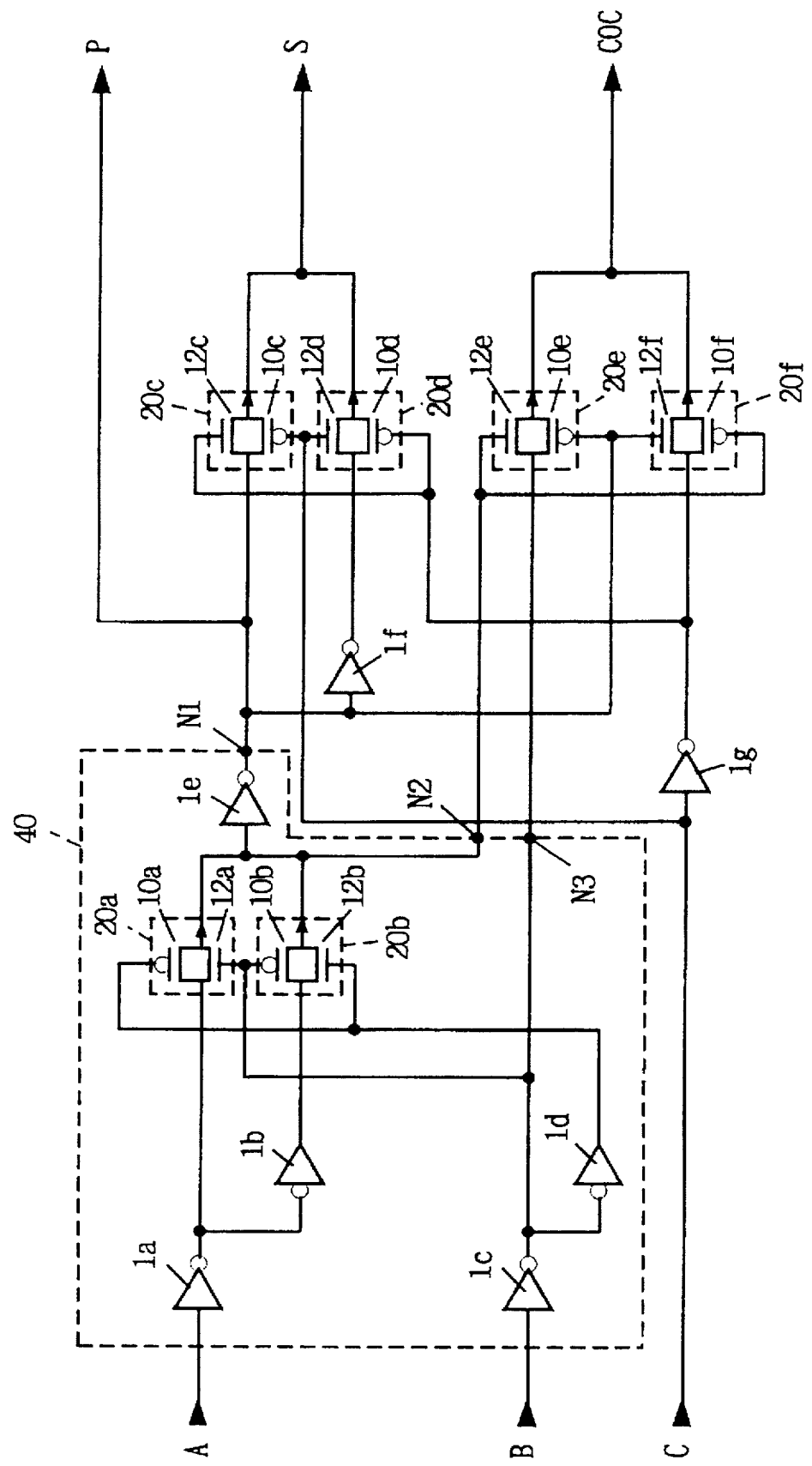
FIG. 9 shows a specific example of the adder of FIG. 8.

FIG. 7 is a circuit diagram of a carry selecting circuit of a carry look ahead circuit in which the selecting circuit of FIG. 1 is used, according to the sixth embodiment of the present invention. FIG. 8 is a block diagram of an adder having a carry look ahead circuit using the carry selecting circuit of FIG. 7. FIG. 9 shows a specific example of the adder of FIG. 8. The configuration of the carry selecting circuit of FIG. 7 is the same as that of the selecting circuit of FIG. 1. Input terminal B of FIG. 1 corresponds to a carry signal input terminal at this stage of FIG. 7, input terminal A of FIG. 1 corresponds to a carry signal input terminal at the previous stage of FIG. 7, and select signal input terminal SA of FIG. 1 corresponds to a carry select signal input terminal of FIG. 7.

In addition to the configuration of the adder of FIG. 13, node N1 is further connected to an exclusive OR signal output terminal P in the adder of FIG. 9.

Referring to FIG. 8, respective bits of data A and B are applied to four full adders 52a–52d. One carry generating portion 55 and one carry selecting circuit 50 are provided with respect to four full adders 52a–52d. In this adder, four bits configure one block. Carry input terminal CI of full adder 52a receives a carry signal from the adder at the previous stage for adding lower bit of data A and B. Carry input terminals CI of full adders 52b–52d are connected to carry output terminals COC of full adders preceding by one bit. Carry signal output terminal COC of full adder 52d is connected to carry generating portion 55. Exclusive OR signals $P_n$–$P_{n+3}$ of respective bits of data A and B applied to respective full adders 52a–52d are propagated from respective full adders 52a–52d to carry generating portion 55. Signal P corresponds to the signal at node N1 in the circuit diagram of a full adder of FIG. 9.

A select signal is propagated from carry generating portion 55 to carry selecting circuit 50 according to the following rule.

(1) When all of exclusive OR signals $P_n$–$P_{n+3}$ of respective bits of data A and B are 1, carry generating portion 55 provides select signal "1", so that carry selecting portion 50 selects and outputs the carry signal from the previous block.

All the exclusive OR signals of respective bits of data A and B being 1 means that one of respective bits of data A and B is "1", and that the other is "0". In this case, carry signal output terminals COC of full adders 52a–52d only propagate a carry from the previous stage. This is equivalent to direct output of the carry signal from the previous block in carry selecting circuit 50.

(2) If none of exclusive OR signals $P_n$–$P_{n+3}$ of respective bits of data A and B are 1, select signal "0" is provided, so that carry selecting circuit 50 selects and outputs a carry signal of this block.

In FIG. 8, the carry signal of this block has a longer delay time than the carry signal from the previous block. Therefore, by using the carry selecting circuit of the present invention, it is possible to increase the operation speed of the adding circuit.

Note that, by using the adders shown in the circuit diagrams of FIGS. 3–6 as adders 52a–52d, the adding circuit having a carry look ahead circuit which operates at a higher speed can be implemented.

Figure 10:
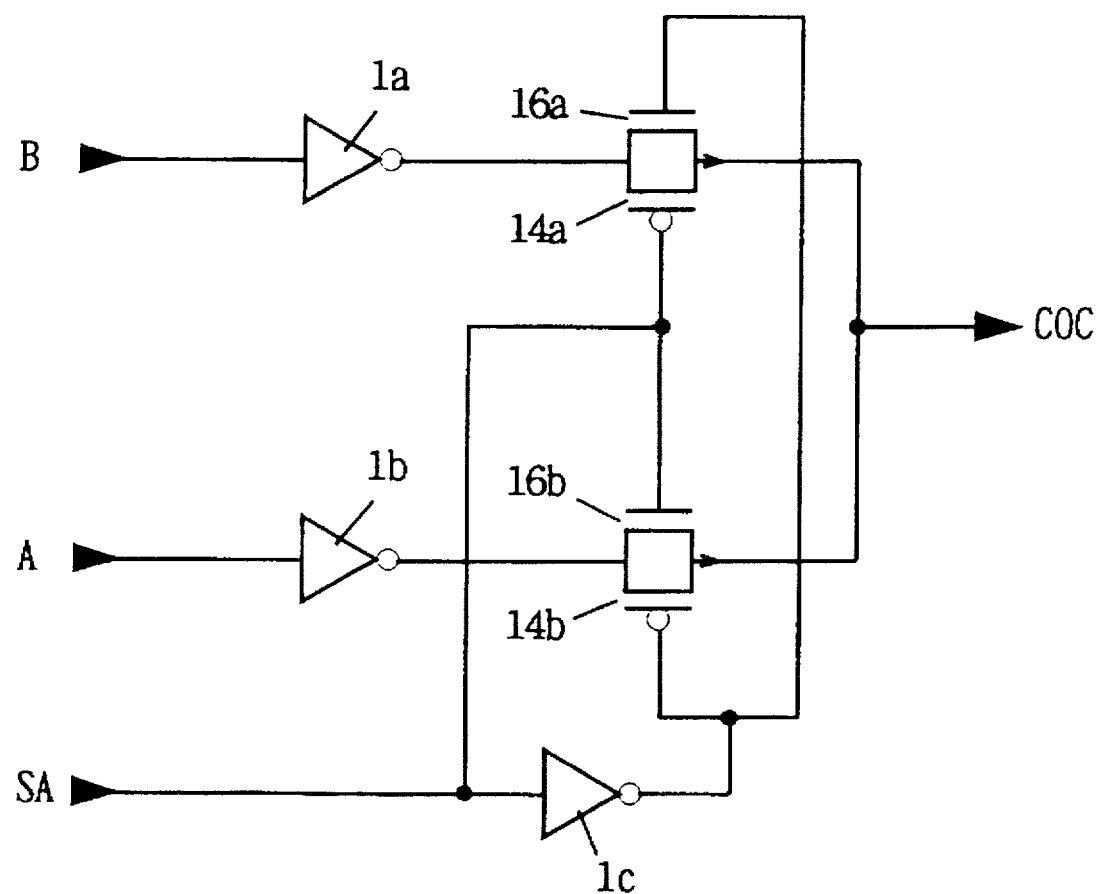
FIG. 10 is a circuit diagram of a selecting circuit according to a seventh embodiment of the present invention.

FIG. 10 is a circuit diagram of the selecting circuit according to the seventh embodiment of the present invention.

Figure 12:
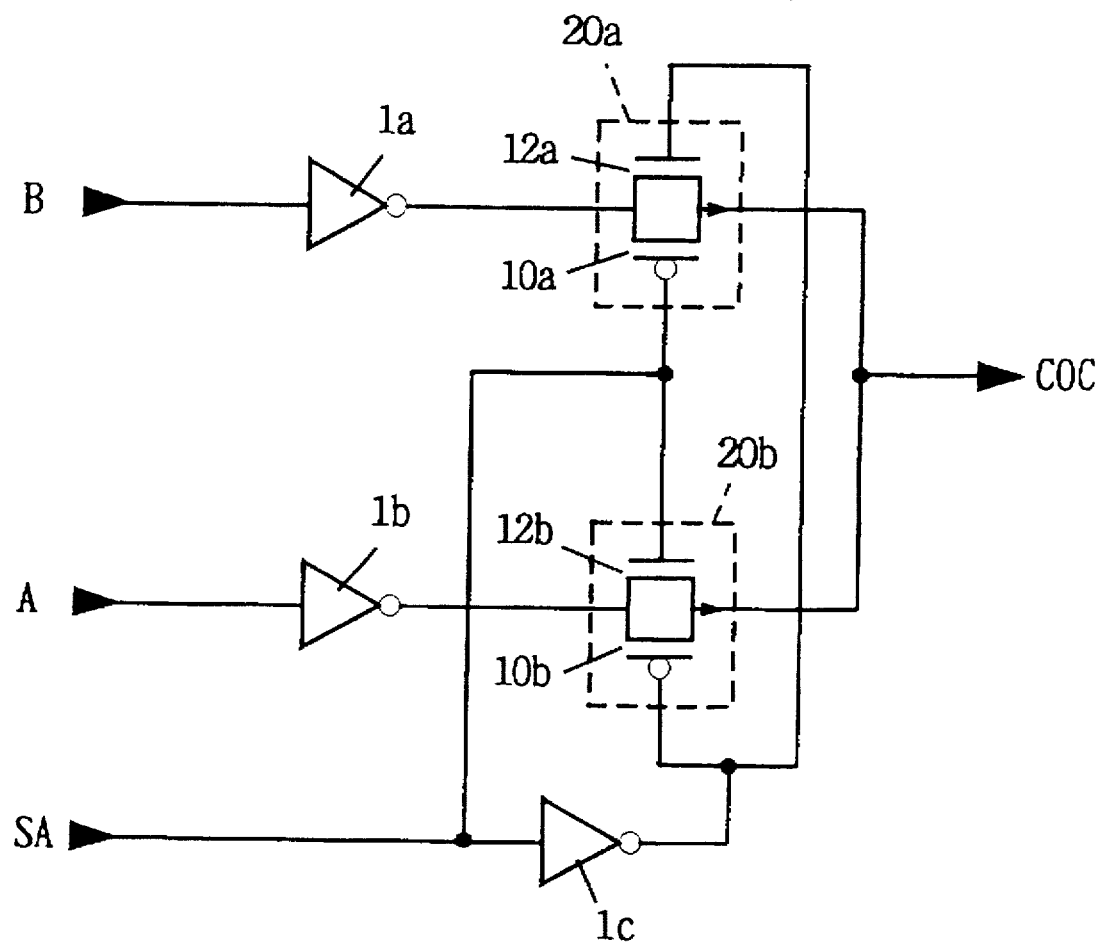
FIG. 12 is a circuit diagram of a conventional selecting circuit selecting between two signals and outputting one of them.

The configuration of the selecting circuit of FIG. 10 is different from that of FIG. 12 in that the transistor size of a transmission gate processing a signal having a shorter delay time is set smaller than the transistor size of a transmission gate processing a signal having a longer delay time.

When data input to data input terminal A has a longer delay time than data input to data input terminal B, for example, the size of transistors 14a and 16a is set smaller than the size of transistors 14b and 16b. As a result, the load to be driven by transistors processing a signal having a longer delay time can be reduced, and the signal having a longer delay time can be provided faster.

Figure 11:
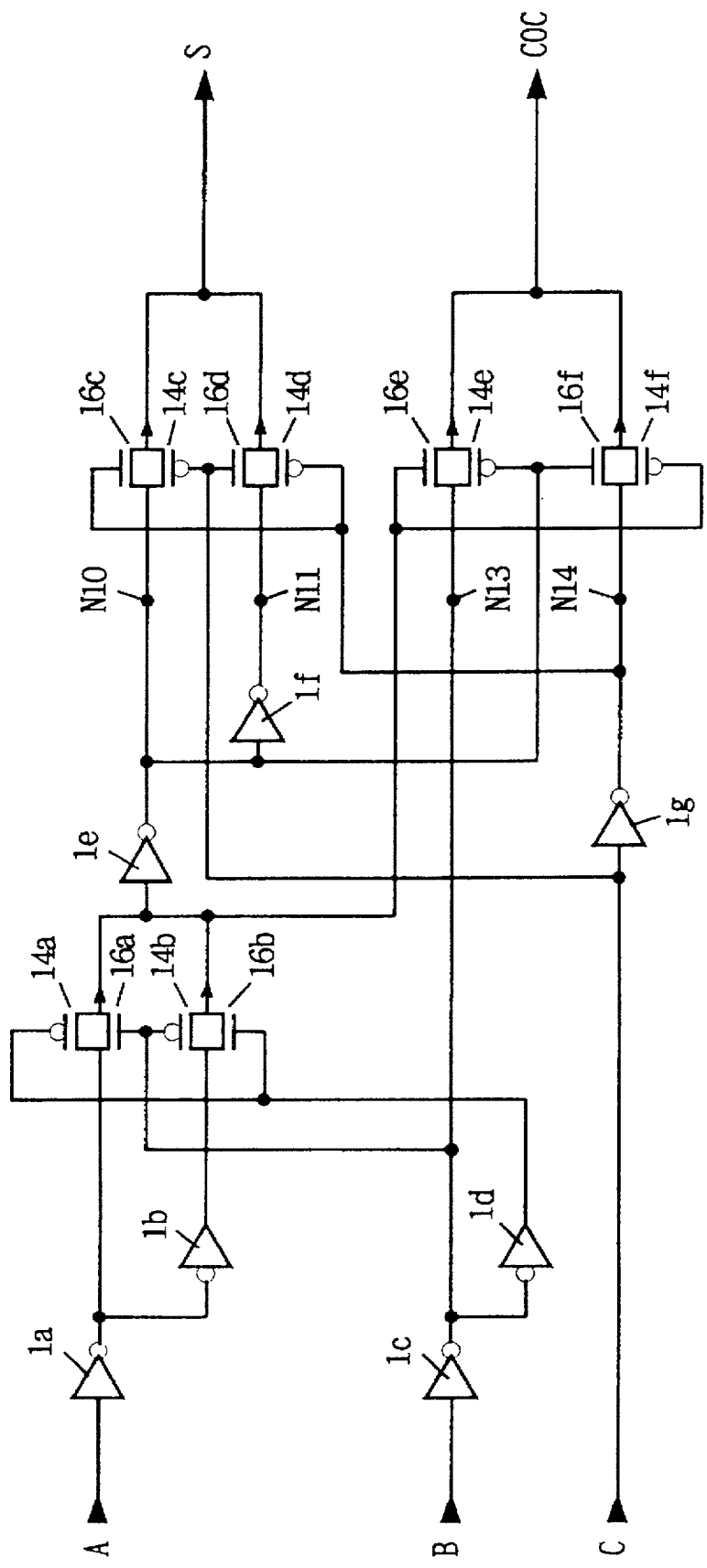
FIG. 11 is a circuit diagram of an adding circuit according to an eighth embodiment of the present invention, in which the selecting circuit of FIG. 10 is used.

FIG. 11 is a circuit diagram of an adding circuit in which the selecting circuit of FIG. 10 is used.

This adding circuit is different from that of FIG. 12 in that the size of transistors 14e and 16e is set smaller than the size of transistors 14f and 16f.

This is because a signal at a node N14 is a carry signal from the previous stage, which has a longer delay time than a signal at a node N13, which is a signal at this stage.

Although the present invention has been described and illustrated in detail, it is clearly understood that the same is by way of illustration and example only and is not to be taken byway of limitation, the spirit and scope of the present invention being limited only by the terms of the appended claims.

What is claimed is:

1. A selecting circuit selecting among a plurality of input signals in response to an applied first or second select signal and outputting the selected signal to an output node, comprising:

first output means having a first time constant and responsive to said first select signal for selectively providing a first input signal out of said plurality of input signals to said output node; and second output means having a second time constant larger than said first time constant and responsive to said second select signal for selectively providing a second input signal, shorter in delay than said first input signal, out of said plurality of input signals to said output node.

2. The selecting circuit according to claim 1, wherein said first output means includes a first tristate buffer, said first tristate buffer having a first transistor group including a plurality of transistors, said second output means includes a second tristate buffer, said second tristate buffer having a second transistor group including a plurality of transistors, and the size of each transistor in said second transistor group is smaller than the size of each transistor of said first transistor group.

3. The selecting circuit according to claim 2, wherein the size of a transistor receiving said first input signal at its gate is smaller than the size of a transistor receiving said first select signal at its gate in said first transistor group.

4. The selecting circuit according to claim 3, wherein the size of a transistor receiving said second input signal at its gate is smaller than the size of a transistor receiving said second select signal at its gate in said second transistor group.

5. The selecting circuit according to claim 2, wherein the size of a transistor receiving said second input signal at its gate is smaller than the size of a transistor receiving said second select signal at its gate in said second transistor group.

6. The selecting circuit according to claim 2, wherein each said transistor is formed of an MOS transistor, and the size of each said transistor is defined by a gate width and an area of a drain region.

7. The selecting circuit according to claim 1, wherein said first output means includes first, second, third, and fourth transistors connected in series between power supply potential and ground potential, said first and second transistors being MOS transistors of a first conductivity type, and said third and fourth transistors being MOS transistors of a second conductivity type opposite to said first conductivity type, said second output means includes first, second, third, and fourth transistors connected in series between the power supply potential and the ground potential, said first and second transistors being MOS transistors of the first conductivity type, and said third and fourth transistors being MOS transistors of the second conductivity type opposite to said first conductivity type, said first or second select signal is applied to the fourth transistor of said first output means and the first transistor of said second output means, and an inversion of said first or second select signal is applied to the first transistor of said first output means and the fourth transistor of said second output means, said first input signal is applied to the second and third transistors of said first output means, and said second input signal is applied to the second and third transistors of said second output means.

8. The selecting circuit according to claim 7, wherein said first input signal is inverted and provided to said output node in response to said first select signal, and said second input signal is inverted and provided to said output node in response to said second select signal.

9. A selecting circuit according to claim 1, wherein said first output means includes a first transmission gate said second output means includes a second transmission gate, and transistors configuring said second transmission gate are smaller in size than transistors configuring said first transmission gate.

10. An adding circuit receiving binary data A, binary data B, and a first carry signal from the previous stage, and providing a second carry signal to a first output node, comprising:

first output means having a first time constant and responsive to a first select signal for selectively providing a first input signal out of a plurality of input signals to a second output node; and second output means having a second time constant larger than said first time constant and responsive to a second select signal for selectively providing a second input signal, shorter in delay than said first input signal, out of said plurality of input signals to said second output node, wherein a logical process output of said binary data A and said binary data B is used as said first or second select signal, said first carry signal is used as said first input signal, said binary data A or said binary data B is used as said second input signal, and said second output node corresponds to said first output node.

11. An adding circuit receiving binary data A, binary data B, and a first carry signal from the previous stage, and providing a second carry signal to an output node, comprising:

select signal generating means for generating a first or second select signal based on a logical process output of said binary data A and said binary data B;

a first tristate buffer responsive to said first select signal for selectively providing said first carry signal to said output node, said first tristate buffer having a first time constant and driving said second output node to change a potential thereon at said first time constant in accordance with said first carry signal; and a second tristate buffer responsive to said second select signal for selectively providing said binary data A or B to said output node, said second tristate buffer having a second time constant greater than said first time constant and driving said output node to change a potential thereon at said second time constant in accordance with said binary data A or B.

12. A carry selecting circuit selecting between a first carry signal at a first stage and a second carry signal at a second stage preceding said first stage in response to an applied carry select signal, and providing the selected signal to an output node, comprising:

select signal generating means responsive to said carry select signal for generating a first or second select signal;

first output means having a first time constant and responsive to said first select signal for selectively providing said second carry signal to said output node; and second output means having a second time constant larger than said first time constant and responsive to said second select signal, shorter in delay than said first select signal, for selectively providing said first carry signal to said output node.

13. A selecting circuit selecting among a plurality of input signals in response to an applied first or second select signal and outputting the selected signal to an output node, comprising:

first output means having a first time constant and responsive to said first select signal for selectively providing a first input signal out of said plurality of input signals to said output node, said first output means driving said output node to change a potential thereon at said first time constant in accordance with said first input signal; and second output means having a second time constant larger than said first time constant and responsive to said second select signal for selectively providing a second input signal, shorter in delay than said first input signal, out of said plurality of input signals to said output node, said second output means driving said output node to change a potential thereon at said second time constant in accordance with said second input signal.

14. An adding circuit receiving binary data A, binary data B, and a first carry signal from the previous stage, and providing a second carry signal to a first output node, comprising:

first output means having a first time constant and responsive to a first select signal for selectively providing a first input signal out of a plurality of input signals to a second output node, said first output means driving said second output node to change a potential thereon at said first time constant in accordance with said first input signal; and second output means having a second time constant larger than said first time constant and responsive to a second select signal for selectively providing a second input signal, shorter in delay than said first input signal, out of said plurality of input signals to said second output node, said second output means driving said second output node to change a potential thereon at said second time constant in accordance with said second input signal, wherein a logical process output of said binary data A and said binary data B is used as said first or second select signal, said first carry signal is used as said first input signal, said binary data A or said binary data B is used as said second input signal, and said second output node corresponds to said first output node.

15. A carry selecting circuit selecting between a first carry signal at a first stage and a second carry signal at a second stage preceding said first stage in response to an applied carry select signal, and providing the selected signal to an output node, comprising:

select signal generating means responsive to said carry select signal for generating a first or second select signal;

first output means having a first time constant and responsive to said first select signal for selectively providing said second carry signal to said output node, said first output means driving said output node to change a potential thereon at said first time constant in accordance with said second carry signal; and second output means having a second time constant larger than said first time constant and responsive to said second select signal for selectively providing said first carry signal, shorter in delay than said second carry signal, to said output node, said second output means driving said output node to change a potential thereon at said second time constant in accordance with said first carry signal.

* * * * *